Nov. 17, 1959
J. W. HOGAN
2,913,662
FEED RATE METERS
Filed Aug. 8, 1956
2 Sheets-Sheet 1
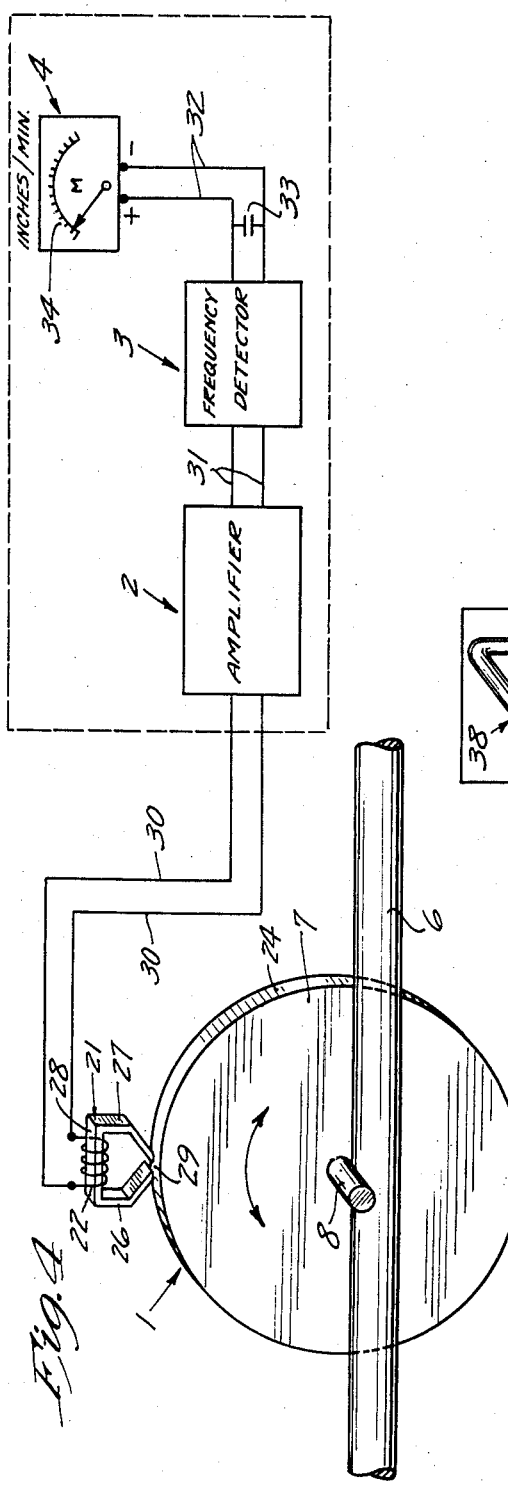
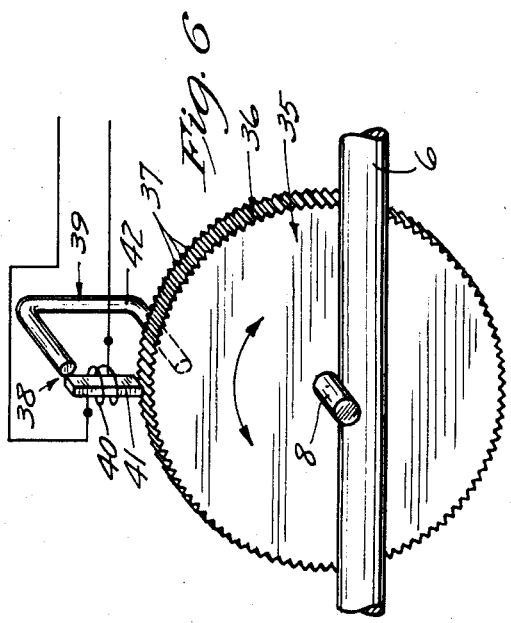
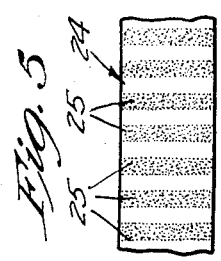
INVENTOR.
John W. Hogan
BY
Merchant & Merchant
ATTORNEYS Nov. 17, 1959 J. W. HOGAN 2,913,662
FEED RATE METERS
Filed Aug. 8, 1956 2 Sheets-Sheet 2
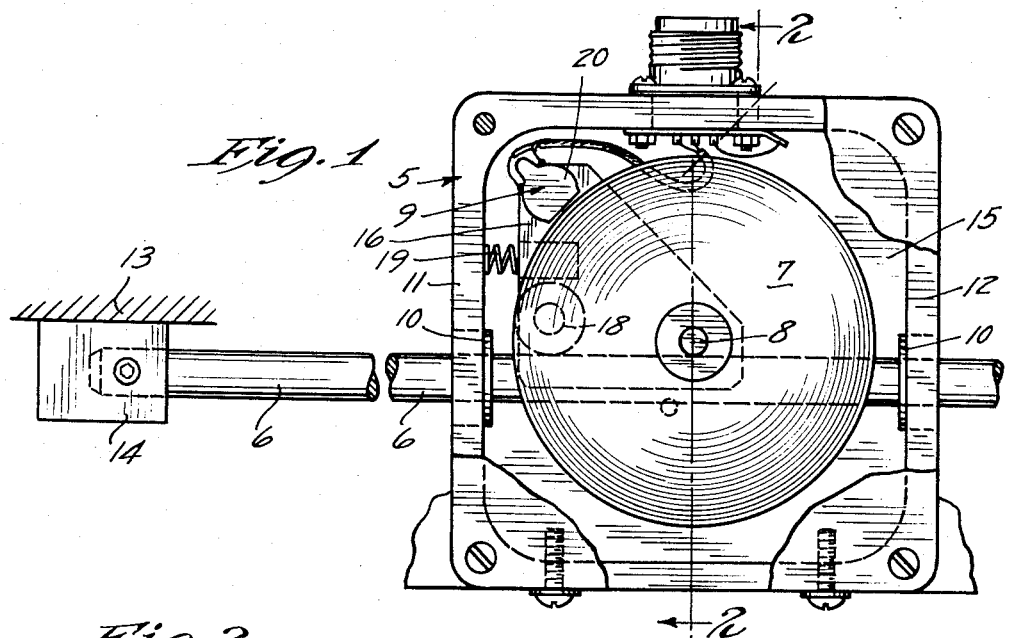
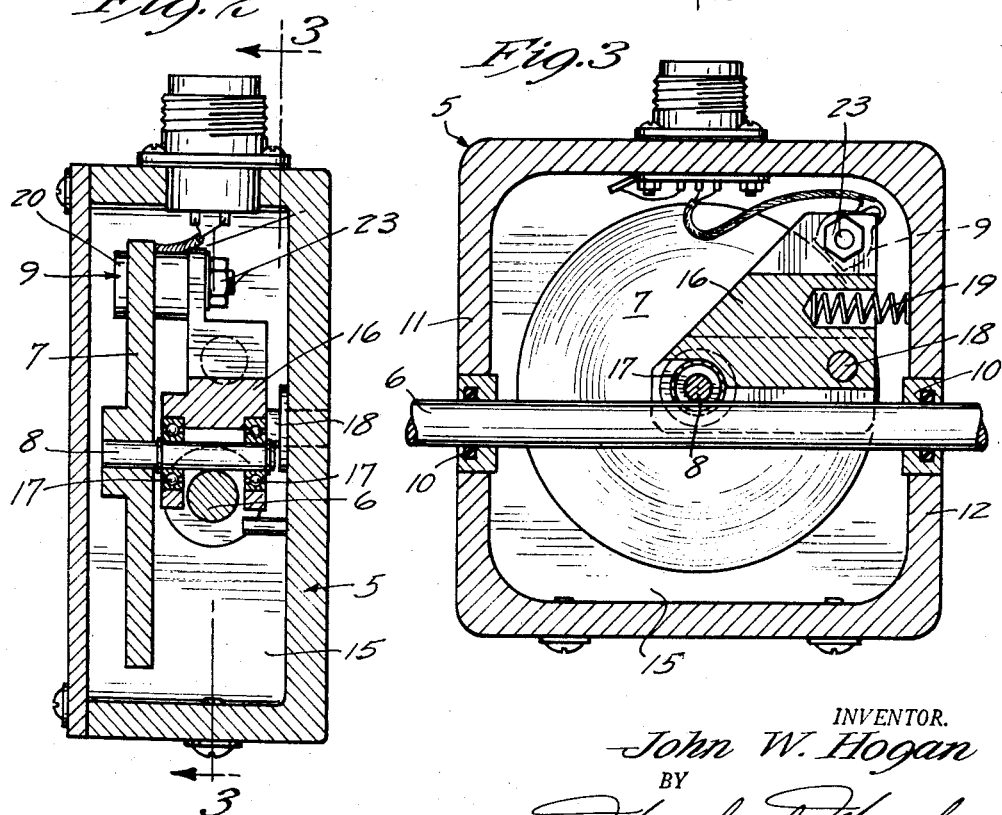
INVENTOR.
John W. Hogan
BY
Merchant & Merchant
ATTORNEYS

United States Patent Office 2,913,662
Patented Nov. 17, 1959

2,913,662

FEED RATE METERS

John W. Hogan, Minneapolis, Minn., assignor, by mesne assignments, to Maico Electronics, Inc., Minneapolis, Minn., a corporation of Minnesota Application August 8, 1956, Serial No. 602,757

6 Claims. (Cl. 324—70)

Generally stated, my present invention relates to improvements in apparatus for measuring and indicating the rates of travel of devices subject to linear or straight line motion; such apparatus being generally referred to herein as a "feed rate meter" because it was primarily designed for use in connection with machine tools and the like to measure feed rates of tool carriages and analogous devices subject to linear feeding movements. The apparatus of the instant invention is exceptionally compact, rugged and reliable. Furthermore, the apparatus of the instant invention has an exceptionally high degree sensitivity resulting in the ability to accurately read a very wide range of feed velocities including extremely low feed rates or velocities.

In the machine tool art, two types of drives are commonly employed between the source of power, usually an electric motor, and the tool carriage or analogous device subject to linear feeding movement, these being a purely mechanical drive on one hand and a hydraulic drive on the other hand. In recent years, the trend has been toward the use of hydraulically powered tool carriage feeds due, among other things, to the smooth, wide range and continuously variable speed control possible with this type of drive system. However, this hydraulic type of drive system or train has presented a greater challenge to those seeking to provide a completely satisfactory apparatus for measuring linear feed rates than have mechanical drive systems, due to the fact that in hydraulic drive trains there is generally no rotary element bearing a definite and fixed velocity relationship to the device subject to linear feeding movements and which is, therefore, suitable for use as a source of velocity information which is accurately indicative of linear motion of a tool carriage or other element subject to linear movement; this shortcoming of hydraulic feed systems being due to the changing viscosity of the hydraulic fluid under changing temperatures, and other well recognized factors.

An important object of the instant invention is the provision of an improved feed rate measuring apparatus of the class described which may be readily applied to a wide variety of linear feed machines including milling machines, lathes and the like without regard to the type of drive train employed and without sacrificing any of the above noted and important attributes of said invention in any such application.

The above and other important objects and advantages of the invention will be apparent from the following specification, appended claims and attached drawings.

In the accompanying drawings, which illustrate the invention, like characters indicate like parts throughout the several views.

Referring to the drawings:

Fig. 1 is a view in side elevation with some parts broken away and some parts shown in section of a preferred form of pickup head adapted for use in carrying out the invention;

Fig. 2 is a vertical sectional view taken on the line 2—2 of Fig. 1;

Fig. 3 is a view similar to Fig. 1 but taken on the section line 3—3 of Fig. 2;

Fig. 4 is a view partly in perspective and partly in line and box diagram illustrating the hookup of the various components of one form of complete measuring apparatus or system constructed in accordance with the invention;

Fig. 5 is a view diagrammatically illustrating the magnetic signal track of the embodiment of the invention shown in Figs. 1–4; and Fig. 6 is a view partly in perspective and partly in diagram illustrating a modified form of pickup head.

First to be described will be the embodiment of the invention shown in Figs. 1 through 5. This complete apparatus or system comprises a signal generating and pickup head, indicated in its entirety by 1, a signal amplifier unit 2, a frequency detector unit 3, and a meter unit 4.

The signal pickup head of Figs. 1 through 4 comprises a rigid hollow body defining a casing 5 which is adapted to be fixedly mounted on the fixed part, not shown, of a machine tool or the like, adjacent a tool carriage or the like thereof. As previously indicated, it is immaterial whether such tool carriage or the like be driven through positive mechanical gearing or through the less positive but smoother and more controllable hydraulic type of gearing or its equivalent, since the apparatus of the invention measures the rate of feed of the carriage or the like without dependence upon the nature of the drive mechanism and will, in fact, provide an accurate measurement even in conjunction with manually powered devices. The signal generating and pickup head 1 further comprises a relatively long drive rod 6, a signal rotor 7, a rotor shaft 2, an electromagnetic transducer 9. The drive rod 6 is mounted and guided for only longitudinal or axial sliding movements with respect to the casing body 5 in suitable apertured bearing bushings 10 in opposed walls 11 and 12 of the casing body 5. One end of the drive rod 6 is adapted to be, and in practice is, coupled to the tool carriage or the like, shown only fragmentarily at 13, by means of a suitable coupling 14, so that the drive rod 6 will partake of common linear advancing and retracting movements of the tool carriage or the like 13. The signal rotor 7 and shaft 8 are located wholly within the internal cavity 15 of the casing body 5 and said shaft extends in a plane normal to the plane of the axis of the drive rod and bears on the latter. The signal rotor 7 is concentrically mounted fast on the shaft 8, which shaft is, in turn, journaled for rotation in a pivotally swingable mounting frame 16 by means of suitable antifriction bearings 17. The rotor axle shaft 8 and drive rod 6 have smooth cylindrical surfaces. The frame 16 is pivotally connected to the casing body 5 by means of a pivot pin 18 that extends generally parallel to but is radially offset from the rotor shaft 8, as seen best in Fig. 3. For the purpose of maintaining a satisfactory frictional driving pressure between the drive rod 6 and rotor shaft 8, the swinging frame structure 16 is yieldingly urged in the direction of the drive rod 6 by means of a compression spring or the like 19, shown best in Fig. 3. Also mounted on the swinging frame structure 16 is the electromagnetic transducer 9.

In the form shown in Figs. 1 through 5, the transducer 9 comprises a suitable nonmagnetic casing 20 containing a suitable core structure 21, and an inductance coil 22. The casing 20 of the transducer 9 is secured to the frame structure 16 adjacent to the periphery of the signal rotor 7 by suitable means such as a stud bolt and nut 23, shown best in Figs. 2 and 3. Actually, the transducer casing 20 projects over the peripheral surface of the signal rotor 7, as shown best in Fig. 2, and the internal arrangement of the transducer is such that the core structure 21 of the transducer is disposed directly over the peripheral surface of the signal rotor 7, as shown best in Fig. 4.

In the embodiment of the invention shown in Figs. 1 through 5, the source of signal energy is a magnetic signal track magnetically recorded on the peripheral surface of the signal rotor 7 and shown diagrammatically in Fig. 5. For this purpose, the signal rotor 7 is preferably of nonmagnetic material such as aluminum and has applied to its signal bearing peripheral surface an iron oxide coating which may be assumed to be of the character applied to magnetic tapes for the recording of audio signals. For the purpose of the instant invention, this signal bearing surface of the rotor 7 has magnetically recorded thereon an endless magnetic signal track comprising a circumferentially extended series of like magnetic signal impulses or cycles. In Fig. 5, the endless annular signal track is indicated as an entirety by 24 and each of the magnetic impulses or cycles is indicated by 25. It is important that these signal cycles of track 24 be alike as to magnitude, polarization direction and spacing, so that each complete magnetic signal cycle will represent the same definite increment of movement of the signal rotor 7 and drive rod 6. Preferably and as illustrated in Fig. 5, the magnetic impulse cycles 25 of the signal track 24 are recorded by what is generally referred to as the "longitudinal recording technique" which means that the direction of polarization is in the present instance circumferentially of the rotor 7.

The core structure 21 of the transducer 9 (see Fig. 4) is formed of ferrous metal or ferrous metal alloy compounded to have a high degree of permeability and low magnetic retentivity to provide a low reluctance path to magnetic flux flow without becoming permanently magnetized. This core structure 21 is of the rather conventional U shape comprising the depending legs 26 and 27 which are integrally connected at their upper ends by a portion 28 and have their lower ends slightly spaced immediately adjacent the signal track 24 to define a magnetic gap 29. In the form illustrated in Figs. 1 through 4, a single induction coil 22 is wound upon the leg connecting portion 28 of the core structure 21, see Fig. 4.

It should now be evident that when linear motion is applied to the tool carriage or the like 13 that the drive rod 6 will be driven in common therewith, and that the signal rotor 7 will be rotated from the drive rod 6 at a rate directly proportional to the rate of linear travel of the rod 6 and tool carriage 13 or the like. Furthermore, it should be evident that the portion of the rotor shaft 8 in frictional driving engagement with the rod 6 will have a surface speed corresponding precisely to the surface speed of the rod but that the signal track 24 of the rotor 7 will have an increased surface speed corresponding to the diameter circumference relationships therebetween and the driving portion of the shaft 8 which will, nevertheless, be directly proportional to the surface velocity of the shaft 8 and rod 6. This diameter and circumference relationship between the shaft 8 and signal bearing peripheral surface 24 of the signal rotor 7 is widely variable, but for the purpose of commercial production, a ratio of sixteen to one (16 to 1) has been found highly satisfactory and to result in sufficient instrument sensitivity to allow readings of extremely wide range of velocities including extremely low velocities.

From an examination of Fig. 5, in the light of the above teaching, it should be evident that each time a magnetically recorded signal impulse or cycle 25 of the signal track 24 comes into registration with the gap 29 of the transducer core structure 21, a magnetic circuit will be completed through the core structure 21 and will induce a corresponding electrical signal impulse or cycle in the induction coil 22. Obviously, under continued rotation of the rotor 7 by the drive rod 6 there will be generated in the inductance coil 22 an alternating electrical signal comprising a series of electrical signal cycles of like magnitude and the frequency of which signal will vary according to the speed of the rotor 7 and drive rod but will always be directly proportional to the velocity of the carriage 13, drive rod 6 and rotor 7.

In the embodiment of the invention illustrated in Figs. 1 to 4, the signal output of the induction coil 22 of the transducer 9 is fed to the input of a frequency meter comprising amplifier unit 2, frequency detector unit 3 and meter unit 4; the output of induction coil 22 being connected to the input of amplifier unit 2 by circuit leads 30; the output of amplifier unit 2 being connected to the input of frequency unit 3 by circuit leads 31; and the output of frequency detector unit being connected to the input of meter unit 4 by circuit leads 32. The voltage amplifier unit 2 may be a conventional electronic voltage amplifier whose output is an A.C. electrical signal of a frequency corresponding to the frequency of the input signal and is, therefore, directly proportional to the velocity of the drive rod 6 and signal rotor 7. The function of the frequency detector unit 3 of the frequency meter section of the apparatus comprising units 2, 3 and 4 is to detect and rectify the A.C. signal and to deliver at its output and to the meter unit 4 a D.C. whose amplitude is directly proportional to the frequency of the A.C. input signal and is, therefore, also directly proportional to the velocity of the drive rod 6 and signal track 24 of rotor 7. Since the units 2 and 3 are of conventional variety, they have been shown only in block diagram. The D.C. output of frequency detector unit 3 is fed to the meter unit 4 which may be a conventional D.C. volt meter calibrated in increments of linear movement per unit of time, such as inches per second or fractions of inches per second, for example. A linear scale is desirable and all that is necessary to meet this requirement is that the meter movement chosen be one which provides a reading whose magnitude is directly proportional to the magnitude of the energizing D.C. source. In order to smooth out any ripple that may be present at the output of the detector unit 3, a condenser 33 of suitable value may be placed across the leads 32. From the above description, it should be apparent that the units 2, 3 and 4 jointly comprise a frequency meter having a visual scale 34 calibrated in units of linear displacement per interval of time and the magnitude of whose reading is directly proportional to the frequency of the signal output of the transducer 9 and to the velocity of the rotor signal track 24 and the rate of linear displacement of the drive rod 6 and tool carriage or the like 13. The inclusion of the amplifier unit 2 is desirable in most instances, but said unit may, nevertheless, be dispensed with under any circumstances where the signal output of the transducer 9 is at a satisfactorily high level for the purpose at hand.

It should be understood that one of the most difficult problems encountered in the development of a satisfactory measuring apparatus or system of the kind and for the purpose described is the creation of sufficient sensitivity to accurately read extremely low velocities. In the system and apparatus described, this problem has been very successfully solved and one of the features thereof largely responsible for this achievement is the vast multiplication of diameter, circumference and velocity between the drive rod 6 and the signal track 24 which, for the purpose of the instant example has been given as being in the neighborhood of sixteen to one (16 to 1). In practice there is, of course, a practical minimum length to each recorded signal cycle 25 comprising the signal track 24. Hence, if we employ signals of minimum length or any given length, any increase in circumferential length of the signal track 24 will proportionately increase the number of signal cycles traversing the transducer 9 per revolution of the rotor 7 and per increment of movement of the drive rod 6. Hence, since the magnitude of the deflection of the D.C. volt meter 4 is directly proportional to the frequency of the electrical signal output of the transducer 9, the above stated sixteen to one (16 to 1) circumference and velocity relationship will provide a proportionately increased meter deflection for any given increment of movement of the drive rod 6. By virtue of this greatly increased sensitivity, it is a simple matter to obtain accurate readings down to one-tenth (1/10) of one inch per minute or lower. Of course, a multi-range volt meter with a plurality of scales and suitable control switch means for selecting scales can be employed. In such a case, it is entirely feasible to provide one scale calibrated to read one inch per minute full scale deflection and divided into ten sections each representing one-tenth (1/10) of one nch per minute, for example.

The modified signal pickup head of Fig. 6, while differing physically and functionally from the pickup head 1 of Fig. 4 produces substantially identical results. In Fig. 6, the drive rod 6 corresponds precisely to the drive rod 6 of Fig. 4, as does also the signal rotor mounting shaft 8. The signal rotor of Fig. 6, however, is somewhat at variance with that of Fig. 4 and comprises a drum or wheel 35 corresponding closely in physical dimensions to the rotor 7 of Fig. 4 but differing therefrom both in the nature of the material from which it is formed and the character and manner of formation or recording of its peripheral signal track. In Fig. 6, the rotor, or at least the peripheral portion thereof, to a considerable radial depth, is formed of magnetic material having a high degree of permeability offering a low reluctance magnetic flux path and having a low degree of magnetic retentivity so that it will not become permanently magnetized. In this case, the signal track, indicated by 36, comprises an endless series of like equally spaced peripheral teeth 37 each representing a signal cycle. In Fig. 6, then, the signal track is mechanically recorded, whereas in Fig. 4 the signal track 24 was magnetically recorded. The circumferential length of and number of signal teeth 37 in Fig. 6 may correspond, respectively, to the circumferential length, spacing and number of magnetically recorded signal cycles 25 of Figs. 4 and 5. In a commercial form of the invention described, the diameter of the rotor shaft 8 and the relationship of such diameter to the diameter of the signal track 24 is such that one inch of linear movement of the drive rod 6 produces sixteen (16) inches of rotary movement of the signal track 24 past the transducer 9.

The electromagnetic transducer of Fig. 6, indicated as an entirety by 38, is also at variance with the transducer 9 of Fig. 4. As illustrated, this transducer 38 comprises a composite core structure 39 and an induction coil 40. The composite core structure 39 comprises a core piece 41 upon which the coil 40 is wound and further comprises a permanent magnet 42 of roughly U-shape. One end of the core piece 41 works in closely spaced relation to the peripheral ends of the signal teeth 37 of track 36 and the other end thereof is in or substantially in contact with one end of U-shaped permanent magnet 42. The other end of the permanent magnet 42 is disposed operatively adjacent a side or axial end portion of the signal rotor 35 at a point somewhat radially inwardly of the signal teeth 37. This places the signal teeth 37 of the rotor 35 in the gap between the lower end of the core piece 41 and the lower end of the permanent magnet 42 to complete a magnetic flux circuit comprising the permanent magnet 42, the core piece 41 and the toothed peripheral portion 36—37 of signal rotor 35. Clearly then, under rotation of the rotor 35 with respect to the transducer 38, the reluctance of the magnetic flux circuit will be varied in cyclic fashion to induce in the coil 40 an A.C. signal which will correspond to the A.C. signal induced in the induction coil 22 of the transducer 9 and whose frequency will be directly proportional to the velocity of the signal rotor 35 and drive rod 6 of Fig. 6.

The core piece 41 of transducer 38, Fig. 6, may be of ferrous material having a high degree of permeability and low retentivity; alternately, however, the core piece 41 may be a permanently magnetized element connected in series with the U-shaped magnet 42 or could be formed integrally with or as a part of the permanent magnet 42. As previously stated, the transducer 39 of Fig. 6 will produce precisely the same kind of an output signal as will the transducer 9 of Fig. 4.

While I have herein described several embodiments which my invention may assume in practice, it will, of course, be understood that the same is capable of further modification without departing from the spirit and scope of the invention as expressed in the following claims hereof.

What I claim is:

1. In an apparatus for measuring the rate of travel of tool carriages and analogous devices subject to limited linear motion, a body adapted to be fixedly secured on a machine tool or the like adjacent a power-driven carriage thereof that is mounted and guided for linear advancing and retracting movements, a straight drive rod mounted and guided on said body with freedom for and only for longitudinal advancing and retracting movements and adapted for coupling to a tool carriage or the like for common movements therewith, a signal rotor carried by said body and journaled for rotation with respect thereto, a motion direction converting mechanical drive between the drive rod and rotor, whereby linear motion of the rod will cause rotation of the rotor at a rate directly proportional to the rate of linear travel of the rod, a surface of the rotor bearing a cyclic annular signal track of uniform frequency and amplitude, and an electrical output transducer carried by said body adjacent to and operatively associated with the signal track of the rotor and the frequency of whose electrical output signal is directly proportional to the velocity of movement of the drive rod, a frequency detector having its input operatively coupled to the output of the transducer and whose output is D.C. of variable magnitude directly proportional to the frequency of the electrical input signal and the velocity of the drive rod, and an electrically operated meter operatively connected to the output of the frequency detector and the magnitude of whose reading is directly proportional to the magnitude of the D.C. energizing current and hence to the frequency of the electrical output of the transducer and the velocity of the drive rod.

2. The structure defined in claim 1 in further combination with a voltage amplifier interposed between the transducer and the frequency detector and whose output signal voltage is of constant amplitude and of varying frequency directly proportional to the transducer output and the velocity of the drive rod.

3. In an apparatus for measuring the rate of travel of tool carriages and analogous devices subject to linear motion, a body adapted to be fixedly secured to a machine tool or the like adjacent a power driven carriage thereof that is mounted for guided linear advancing and retracting movements, a straight drive rod mounted and guided on said body with freedom for and only for longitudinal advancing and retracting movements and adapted for coupling to a tool carriage or the like to partake of common advancing and retracting movements therewith, a frame member pivoted to said body on an axis generally normal to the axis of the drive rod, a signal rotor rotatably mounted on said frame by means of a rotor shaft rigid therewith and journaled in said frame and whose axis extends parallel to and is spaced radially from the pivot axis of said frame, the rotor shaft having a concentric cylindrical portion in frictional driving engagement with the surface of said drive rod, yielding means urging said pivoted frame in a direction to produce a desired frictional driving pressure between the cooperating surfaces of the rotor shaft and drive rod, a surface of the signal rotor bearing a cyclic annular signal track of uniform frequency and amplitude, an electrical output transducer mounted on said pivoted frame and disposed in operative association with the signal track of the rotor and the frequency of whose electrical output is proportional to the velocity of the drive rod and rotor, the annular signal track being concentric with the rotor axis and being of much greater diameter than the portion of the rotor shaft in frictional driving engagement with the rod, whereby to increase the velocity of the signal track with respect to the velocity of the drive rod to obtain a proportional increase in signal frequency of the electrical output of the transducer, an electrically operated meter operatively connected to the electrical signal output of the transducer and the magnitude of whose reading is directly proportional to the frequency of the electrical signal output of the transducer and to the velocity of the drive rod.

4. The structure defined in claim 3 wherein the cooperating surfaces of the drive rod and rotor shaft are smooth.

5. The structure defined in claim 3 wherein the drive rod is cylindrical and the cooperating surfaces of the rotor shaft and rod are smooth.

6. The structure defined in claim 3 wherein the drive rod is cylindrical and the cooperating surfaces of the rotor shaft and rod are smooth, and wherein the cyclic annular signal track of the signal rotor is concentric with but of much greater diameter than the rotor shaft, the velocity of the rotor signal track being greatly increased with respect to the surface velocity of the drive rod to proportionately increase the sensitivity of the measuring apparatus and its ability to measure extremely low feed rates of the drive rod.

References Cited in the file of this patent

UNITED STATES PATENTS

| | | |
|---|---|---|
| 1,323,240 | Bennett | Dec. 2, 1919 |
| 2,731,599 | Groeper | Jan. 17, 1956 |
| 2,786,978 | Warner | Mar. 26, 1957 |

FOREIGN PATENTS

| | | |
|---|---|---|
| 933,173 | Germany | Sept. 22, 1955 |